Figure 3A:
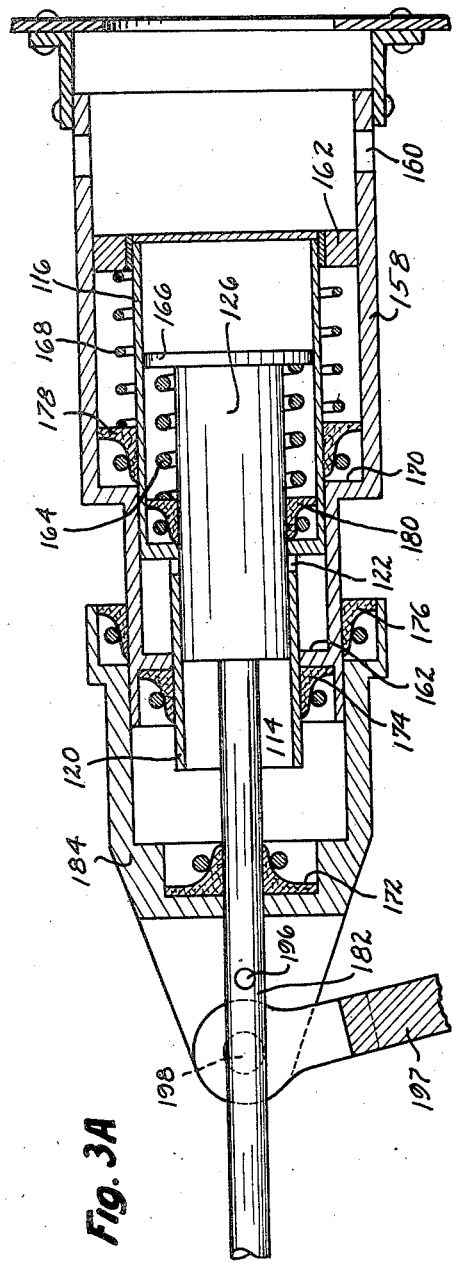

Jan. 2, 1940.  P. H. MISTRAL  2,185,264
FLUID PRESSURE PRODUCING DEVICE
Filed Feb. 26, 1937  4 Sheets-Sheet 1
Fig.1
Fig.2
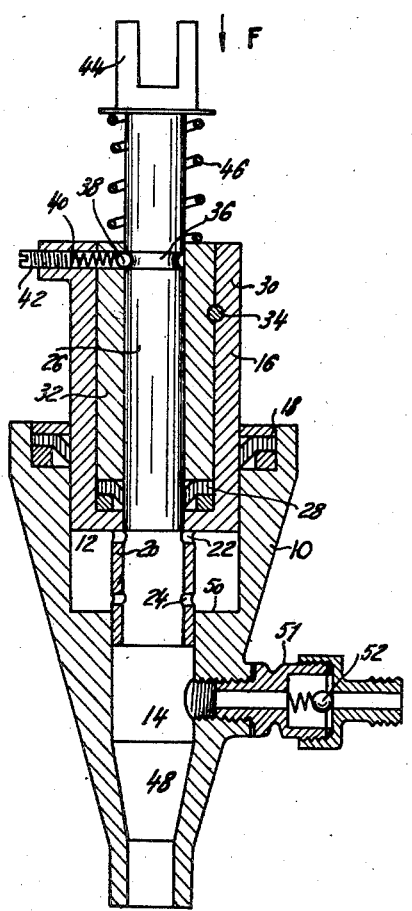
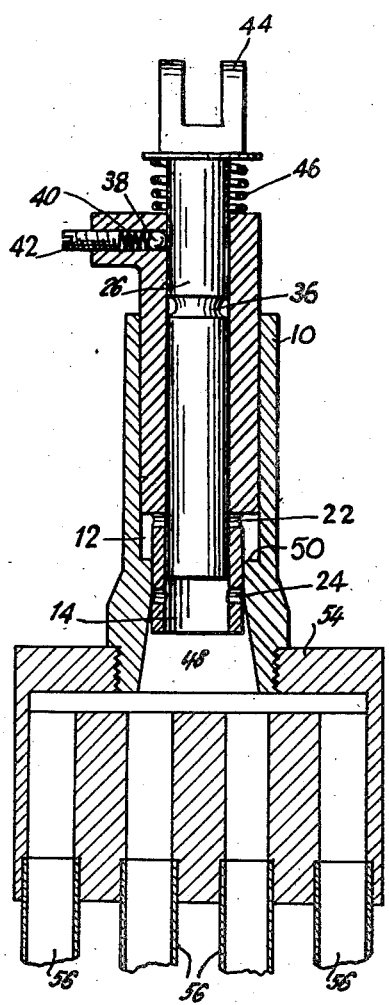
Inventor
Paul H. Mistral
By
Jerome R. Cox.
Attorney.

Jan. 2, 1940.  P. H. MISTRAL  2,185,264
FLUID PRESSURE PRODUCING DEVICE
Filed Feb. 26, 1937  4 Sheets-Sheet 2
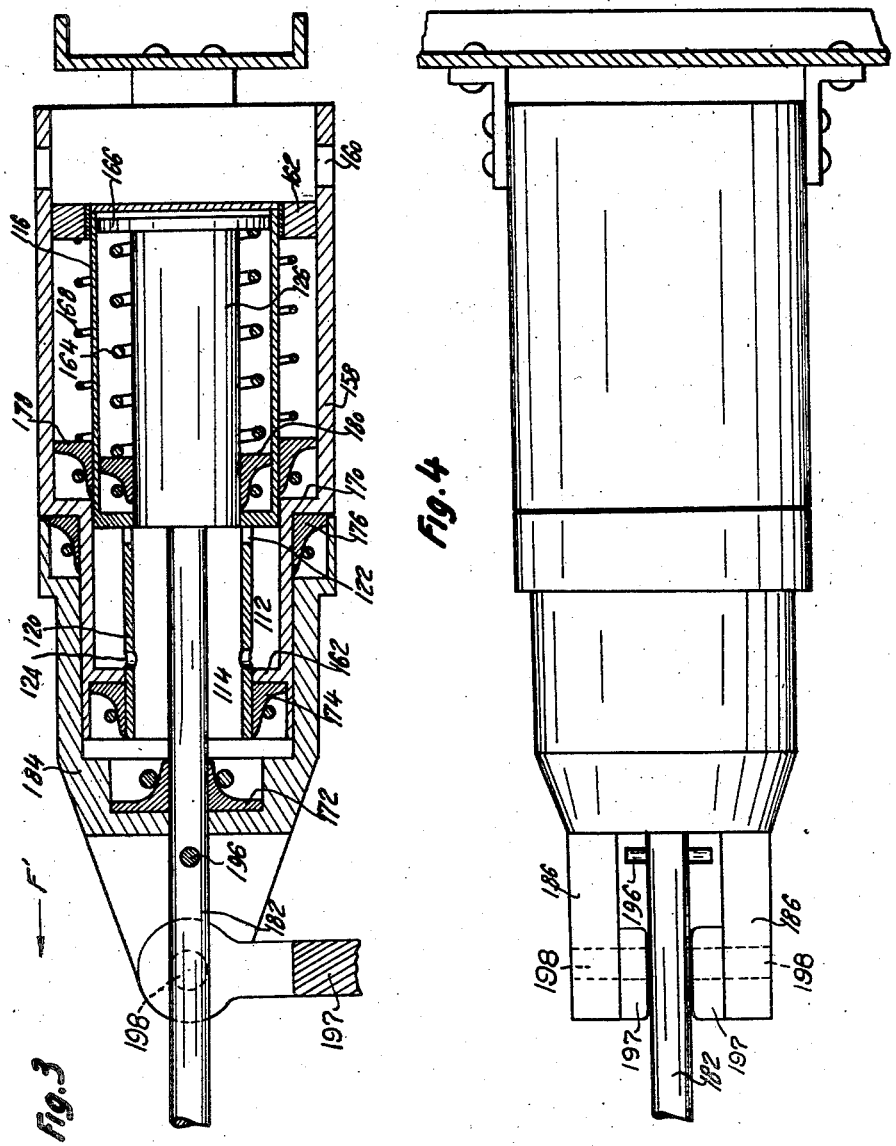
Inventor
*Paul H. Mistral*
By
*Jerome R. Cox*
Attorney Jan. 2, 1940.  P. H. MISTRAL  2,185,264
FLUID PRESSURE PRODUCING DEVICE
Filed Feb. 26, 1937  4 Sheets-Sheet 3

INVENTOR.
PAUL HENRI MISTRAL
BY
Jerome Q. Cox
ATTORNEY.

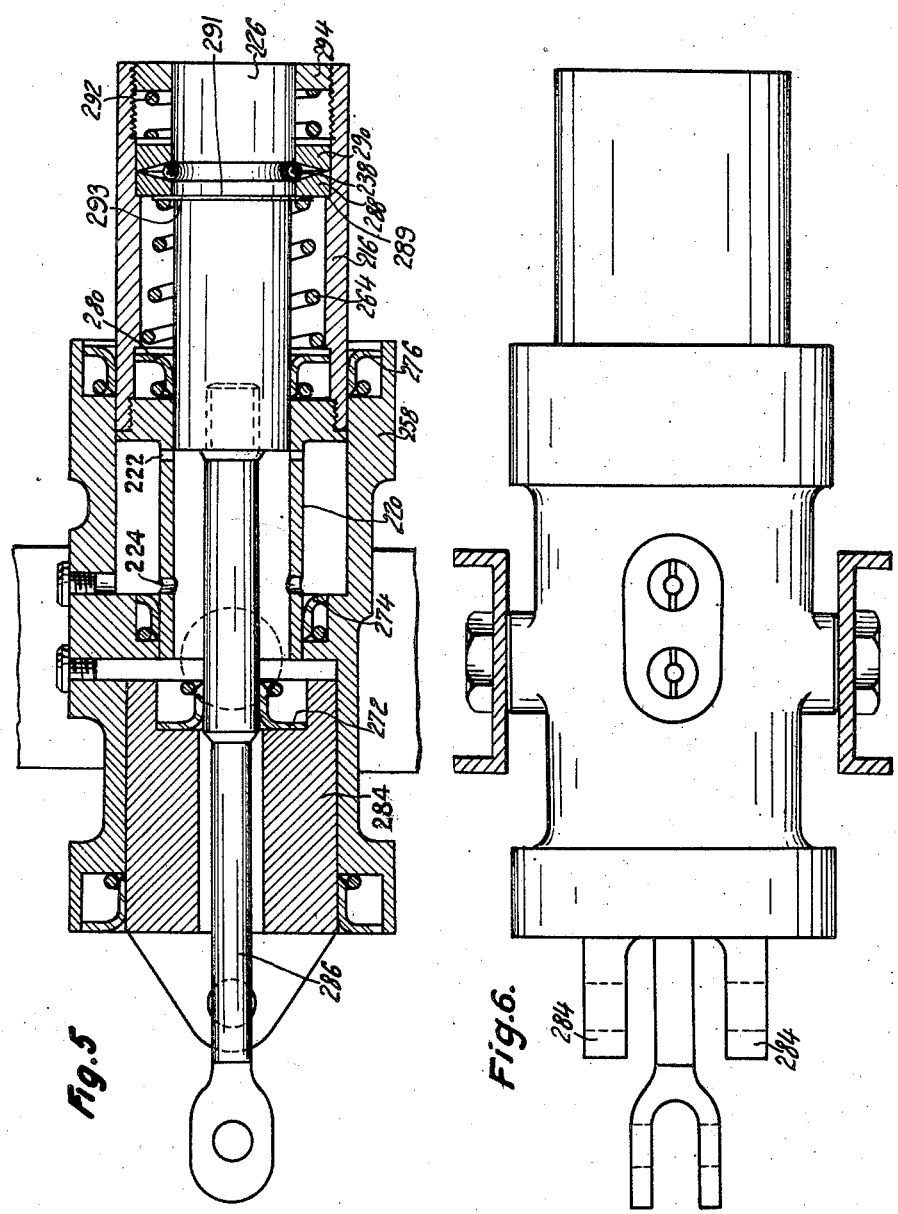

Patented Jan. 2, 1940

2,185,264

UNITED STATES PATENT OFFICE 2,185,264

FLUID PRESSURE PRODUCING DEVICE

Paul Henri Mistral, Paris, France, assignor to Bendix Aviation Corporation, South Bend, Ind., a company Application February 26, 1937, Serial No. 127,839½
In France August 26, 1936

4 Claims. (Cl. 60—54.6)

This invention relates to fluid pressure producing devices and is concerned more particularly with master cylinders adapted to be used for the actuation of hydraulic brake systems for motor vehicles.

In order to secure quickly, with minimum motion and effort, the highest possible fluid pressure for a given actuating force applied to the fluid pressure producing device, the latter embodies a low pressure producing means having a large capacity to do the light work of taking up the clearance, overcoming flexibilities and the like inherent in the fluid pressure responsive mechanism, and a high pressure producing means to do the heavy work and permitting the application of high working pressure upon a substantial part of movement of the control pedal or lever.

One of the objects of the present invention is to provide a smooth transition from the stage of low pressure to the stage of high pressure.

Another object of the invention is to provide a fluid pressure producing device including a low and a high pressure producing means adapted to be operated simultaneously to apply an initial pressure on the fluid, whereby upon increase of pressure applied to the fluid the communication between the low pressure producing means and the high pressure producing means is repeatedly cut off and reestablished gradually to step up the pressure applied on the fluid.

A further object of the invention is to provide a fluid pressure producing device including a low pressure cylinder having a piston and a high pressure cylinder having a piston, the transition from the stage of low pressure to the stage of high pressure taking place upon a relative movement between the two pistons.

Still another object of the invention is to provide a fluid pressure producing device including a low pressure piston and a coaxial high pressure piston, said pistons being arranged in such a manner that upon increase of pressure upon the fluid one piston is displaced with respect to the other to transfer gradually the pressure to the fluid.

A still further object of the invention is to provide a fluid pressure producing device including a low pressure cylinder having a piston and a high pressure cylinder having a piston, said pistons being arranged to permit the disconnecting of the low pressure cylinder upon a relative movement between the two pistons.

Other objects and advantages of the invention will appear from the following description taken in connection with the accompanying drawings, in which—

Figure 5A:
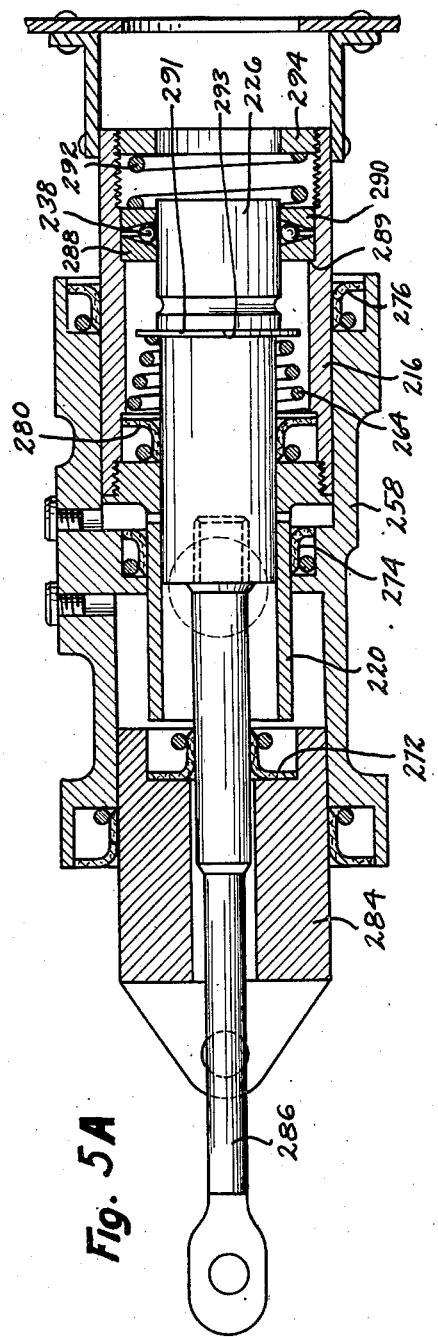

Fig. 1 is a vertical section view of one embodiment of the present invention,

Fig. 2 is a similar view of another embodiment of the present invention, showing however the various parts in brake applying position, Fig. 3 is a view in section of still another embodiment, Fig. 3A is a section corresponding to Fig. 3 showing the parts in their operated positions, Fig. 4 is a top view of the embodiment shown in Fig. 3, Fig. 5 is a view similar to Fig. 3 and shows a further embodiment, Figure 5A is a section corresponding to Fig. 5 showing the parts in their operated positions, and Fig. 6 is a top view of the embodiment shown in Fig. 5.

Referring to the drawings for more specific details of the invention, the compression device is formed by a double bore casting 10 forming a low pressure cylinder 12 of comparatively large volume and a high pressure cylinder 14 of comparatively small volume. In the low pressure cylinder 12 is adapted to reciprocate a big diameter piston 16 engaged on its periphery by a sealing gasket 18. The piston 16 adapted to operate as a low pressure piston is formed with a sleeve 20 having a diameter corresponding to the bore of the high pressure cylinder 14 and adapted to reciprocate in the latter. In the sleeve 20 are formed ports 22 and 24 which in normal position provide a communication between the low pressure cylinder 12 and the high pressure cylinder 14.

The low pressure piston is formed with a central bore in which is mounted a small diameter piston 26 adapted to operate as a high pressure piston. The piston 26 is engaged on its periphery by a sealing gasket 28. In the embodiment shown in Fig. 1 the low pressure piston 16 is shown as being formed by a cylindrical member 30 and a sleeve member 32 interlocked by a key 34.

The high pressure piston 26 is formed with an annular groove 36 into which engages a ball 38 loaded by a spring 40. This spring loaded ball 38 forms a yielding driving connection between the two pistons. The spring 40 loading the ball 38 is mounted in a bore closed by a screw 42 and the load of the spring taking support on the screw 42 can be adjusted by rotating the latter.

The piston 26 is formed with a coupling 44 adapted to be connected by a thrust member to the control pedal or lever not shown on the drawings. A spring 46 is inserted between the coupling 44 and the top of the low pressure piston 16.

Assuming that the system is filled with suitable fluid, upon actuation of the brake pedal or lever a thrust is transmitted to the coupling 44 in the direction of the arrow F, resulting in moving simultaneously both the pistons on the compressive stroke. The fluid forced by the two pistons passes into the discharge chamber 48, and then into a fluid pressure delivery pipe connected thereto to be directed to the fluid pressure responsive devices such as the wheel cylinders not shown on the drawings.

During the initial movement of the pistons, the fluid compressed in the low pressure cylinder 12 is forced therefrom through the ports 22 and 24 into the discharge chamber 48. Then, due to the advance of the sleeve 20, the ports 24 come below the plane 50 and are covered by the wall of the high pressure cylinder 14. The fluid is then forced from the low pressure cylinder 12 through the ports 22.

As the pressure on the fluid has attained a value equal to the resistance of the connection between the two pistons formed by the spring loaded ball 38, the ball is pushed backwards, the two pistons separate one from another, and the high pressure piston 26 continues alone its compressive stroke. This forward movement of the piston 26 closes the ports 22 and the low pressure cylinder 12 is then completely shut off.

As the high pressure piston 26 continues its forward stroke, the pressure increases in the discharge chamber. Owing to the small area of this piston a substantially small effort applied to the control lever or pedal permits the obtaining of a substantially high pressure in the discharge chamber and in the fluid pressure responsive devices connected thereto.

In the event of the master cylinder according to the present invention being used for actuating a hydraulic brake system of a motor car, the common movement of both the pistons can be used to take up the clearance between the brake shoes and the brake drums, and the movement of the small diameter piston 26 is used to apply the final braking pressure.

It will be observed that, as the pressure increases in the discharge chamber 14, said pressure reacts on the head of the sleeve 20, and causes a backward movement of the low pressure piston 16 which prevents a sudden passage from the low pressure stage to the high pressure stage. This construction enables the pressure applied to the fluid to be stepped up gradually so that a progressive transition takes place from the low pressure stage to the high pressure stage.

Should the effort applied to the high pressure piston be of such an extent as to create an important increase of pressure in the discharge chamber 48, this pressure reacting on the head of the sleeve 20 will shift backwards the piston 16, against the resistance of the spring 46, so as to uncover the ports 24. A communication is then re-established between the high pressure cylinder 14 and the low pressure cylinder 12, which communication is again cut off due to the increase of load on the spring 46 which becomes compressed under the action of the effort which continues to act on the coupling 44 causing a forward movement of the piston 16. The ports 24 then come again below the plane 50 and are covered by the wall of the high pressure cylinder 14 and this repeated cutting off and establishing communication between the low pressure cylinder and the high pressure cylinder permits an extremely smooth transition from low pressure to high pressure without any detrimental jerk taking place.

As the effort acting on the coupling 44 is relieved, the high pressure piston returns to normal position under the action of the spring 46. When the high pressure piston, in returning, reaches its original position relative to the low pressure piston the two pistons are interlocked by the spring loaded ball 38, and the two pistons thereafter move as a unit to their fully released positions, and the master cylinder is ready to operate again.

The cylinder can be connected to a fluid reservoir not shown on the drawings by means of a fitting 51 controlled by a valve, which can be formed by a spring loaded ball 52. The areas of the piston 26 and the end of the sleeve 20 and the strength of the spring 46 as well as the strength of the spring 40 are proportioned so that the resulting pressure during the high pressure operation, the pedal pressure required during both the low pressure and high pressure operation and the time of change-over from low pressure to high pressure most nearly approach the desired characteristics for the operation of the brakes or other operated mechanism.

It will be observed from the foregoing that the fluid pressure producing device according to the invention presents the advantage consisting in that the application of increased pressure is realised without having recourse either to valve means or to locking means, which are expensive and are often subject to disadjustment.

In the subsequent embodiments similar parts are designated by similar reference numerals, and the operation of said embodiments is identical to that described above.

The embodiment shown in Fig. 2 is in all respects similar to that illustrated in Fig. 1, except that the discharge chamber 48 is connected to a distribution casing 54 from which four conduits 56 lead to respective pressure responsive devices, for instance, to four wheel cylinders. The braking effort is equally divided between the four wheels of the vehicle.

In the Figs. 3 and 4 is illustrated the use of the master cylinder according to the present invention as a "brake amplifier", i. e., as a force multiplying means.

This embodiment includes a fixed casing 158 adapted to be secured to the vehicle chassis such as by means of an aperture 160 formed in said casing. The low pressure piston 116 is formed with a sleeve 120 having a diameter corresponding to the bore of the flange 162 projecting from the fixed casing 158, and carries a head 162. The high pressure piston 126 has a diameter corresponding to that of the sleeve 120. A relatively strong spring 164 is inserted between a head 166, formed on the high pressure piston 126, and the low pressure piston 116. A weaker spring 168 is inserted between the head 162 and a seat 170 formed on the casing 158 to assist the return of the low pressure piston. In normal position a communication is provided between the low pressure cylinder 112 and the high pressure cylinder 114 by means of ports 122. Various sealing gaskets 172, 174, 176, 178 and 180 are provided to ensure a suitable sealing action. The high pressure piston 116 is shown as being formed with a pull rod 182 connected to a manually operated control lever or pedal.

A fluid pressure responsive piston 184 is sleeved on the casing 158 and is adapted to be displaced in the direction of the arrow F¹ as pressure is applied to the fluid. The piston 184 is formed with a yoke 186 operatively connected to the vehicle brake hook up so that the movement of the piston 184 in the direction of the arrow F¹ causes an application of the vehicle brakes.

In operation, a pull exerted on the manually operated rod 182 results in moving the piston 126 connected to said rod as well as of the piston 116 which is displaced through the intermediary of the spring 164. During the initial movement of the two pistons the fluid compressed in the low pressure cylinder 112 is forced through the ports 122 into the high pressure cylinder 114, the fluid pressure being transmitted to the pressure responsive piston 184.

As the pressure on the fluid has attained a value corresponding to the resistance of the spring 164 the latter is compressed, and the high pressure piston 126 is then displaced with respect to the low pressure piston 116 closing the ports 122 provided in the sleeve 120. The low pressure chamber 112 is thus shut off and the high pressure piston 126 is then alone operative to apply pressure on the pressure responsive piston 184. Since the area of the high pressure piston 126 is much smaller than that of the pressure responsive piston 184 a small pull applied to the rod 182 permits the application of a substantially high pressure to the piston 184 and to the brake hook up connected thereto. It appears from the foregoing that the brake amplifier according to the present invention permits the manual effort applied to the brake pedal to be substantially increased, thus eliminating the need of any servo-mechanism or booster.

The device illustrated in the Figures 5, 5A and 6 is in all respects similar to that shown in Figures 3, 3A and 4, except that the low pressure piston is normally interconnected with the high pressure piston by means of balls 238 engaged in a groove 236 formed on the periphery of the high pressure piston 226. The balls 238 are inserted between two conical surfaces formed on washers 288 and 290 respectively abutting against a shoulder 289 and the spring 292. The spring 292, the tension of which can be adjusted by means of a nut 294 threaded in the low pressure piston 216, acting in conjunction with the conical surfaces of the washers 288 and 290 resiliently urges the balls 238 into the groove 236. The spring 264 is compressed between the low pressure piston and a flat washer 291 abutting against a shoulder 293 formed on the high pressure piston.

If desired a lost motion connection can be provided between the manually operated rod 186 and the pressure responsive piston 184 operatively connected to the brake hook up in case the master cylinder becomes inoperative. As shown in Figures 3 and 4 a pin 196 is secured to the rod 182 and is adapted to engage a member 197 which may be a brake operating lever pivotally connected to the piston 184 by means of pins 198 and operatively connected to the brake hook up in case of failure of the master cylinder.

Although this invention has been described in connection with certain specific embodiments the principles involved are susceptible of numerous other applications that will readily occur to persons skilled in the art. The invention is therefore to be limited only as indicated by the scope of the appended claims.

Having thus described the various features of the invention, what I claim as new and desire to secure by Letters Patent is:

1. A fluid pressure producing device comprising a low pressure producing means including a piston, a high pressure producing means including a piston, a spring between said pistons, and means automatically actuated upon the fluid being subjected to pressure and dependent on the fluid pressure acting on both pistons and upon the pressure of the spring between the pistons for establishing and closing communication between the low pressure producing means and the high pressure producing means.

2. A fluid pressure producing device comprising a low pressure cylinder, a low pressure piston mounted in the said cylinder, a high pressure cylinder having a diameter smaller than that of the low pressure cylinder, a sleeve connected to the low pressure piston and adapted to reciprocate in the high pressure cylinder, said sleeve defining a bore in the low pressure piston of smaller diameter than the high pressure cylinder, a high pressure piston mounted in the said bore, apertures in the sleeve adapted to provide a communication between the low pressure cylinder and the high pressure cylinder, a yielding driving connection between the pistons permitting a simultaneous displacement of the pistons to apply an initial pressure on the fluid and close one of the apertures provided in the sleeve, said connection being adapted to yield as a predetermined pressure is applied to the fluid to permit the displacement of the high pressure piston for applying an increased pressure on the fluid and close the other aperture provided in the sleeve, whereby the low pressure piston is then adapted to be displaced with respect to the high pressure piston under the action of the pressure acting on the head of the said sleeve to open the first named aperture.

3. A fluid pressure producing device comprising a low pressure cylinder having a piston, a high pressure cylinder having a piston adapted to operate simultaneously with the piston in the first cylinder and having means yieldably and releasably connecting it to the first piston to apply an initial pressure on the fluid and to be disconnected from the latter to apply an increased pressure on the fluid, and a pressure controlling means including two apertures normally providing communication between the low pressure cylinder and the high pressure cylinder, and of which the one is shut off upon simultaneous operation of the two pistons for applying an initial pressure on the fluid and the other is shut off upon movement of the high pressure piston independently of the low pressure piston, the first aperture being adapted to be reopened upon increase of pressure in the high pressure cylinder.

4. A fluid pressure producing device comprising a low pressure cylinder, a low pressure piston having a central bore provided therein, a high pressure cylinder, a high pressure piston mounted in the said bore, a yielding driving connection between the pistons permitting a simultaneous displacement of the pistons to apply an initial pressure on the fluid and adapted to yield upon the increase of the said pressure to permit the displacement of the high pressure piston with respect to the low pressure piston, and a movable sleeve connected to the low pressure piston and adapted to reciprocate in the high pressure cylinder, said sleeve being provided with one aperture adapted to be cut off by the wall of the high pressure cylinder upon initial displacement of the two pistons and with another aperture adapted to be cut off by the high pressure piston upon its displacement with respect to the low pressure piston.

PAUL HENRI MISTRAL.